United States Patent [19]

Hudnall

[11] 4,180,055

[45] Dec. 25, 1979

[54] SOLAR-HEAT COLLECTOR

[76] Inventor: Walter E. Hudnall, 2157 W. 236th Pl., Torrance, Calif. 90501

[21] Appl. No.: 866,619

[22] Filed: Jan. 3, 1978

[51] Int. Cl.$^2$ .............................................. F24J 3/02
[52] U.S. Cl. .................................... 126/446; 165/76; 165/183; 165/171
[58] Field of Search ............... 126/270, 271; 237/1 A; 165/168, 76, 176, 170–175, 179–185; 285/419

[56] References Cited

U.S. PATENT DOCUMENTS

| | | | |
|---|---|---|---|
| 3,227,153 | 1/1966 | Godel et al. | 126/271 |
| 3,672,446 | 6/1972 | Tibbetts et al. | 165/183 |
| 4,011,856 | 3/1977 | Gallagher | 126/271 |
| 4,026,267 | 5/1977 | Coleman | 126/270 |
| 4,026,273 | 5/1977 | Parker | 126/271 |
| 4,036,209 | 7/1977 | Press | 126/271 |
| 4,081,289 | 3/1978 | Campbell | 126/271 |

*Primary Examiner*—James C. Yeung
*Attorney, Agent, or Firm*—Francis X. LoJacono

[57] ABSTRACT

A solar-heat-collector apparatus providing a means for gathering and concentrating solar radiation at a maximum collecting rate, regardless of the incident angle of the solar radiation impinging on the apparatus. The apparatus comprises an outer housing and an inner housing arranged in spaced relation to each other—forming an insulating gap therebetween. Disposed within the second housing is a continuously arranged solar-pipe system on which is affixed compatible, molded, heat-absorbing, finned bodies wherein the fin members thereof extend radially outward in a longitudinal array of panels arranged at various angular degrees about the pipe to increase the radiation impinging area, so as to receive the maximum solar energy as it enters through either side of the transparent housing at any given angular displacement. The apparatus can be positioned to receive solar radiation simultaneously from both sides when a parabolic reflector unit is so positioned to reflect the solar radiation to the side not directly exposed to solar radiation.

5 Claims, 8 Drawing Figures

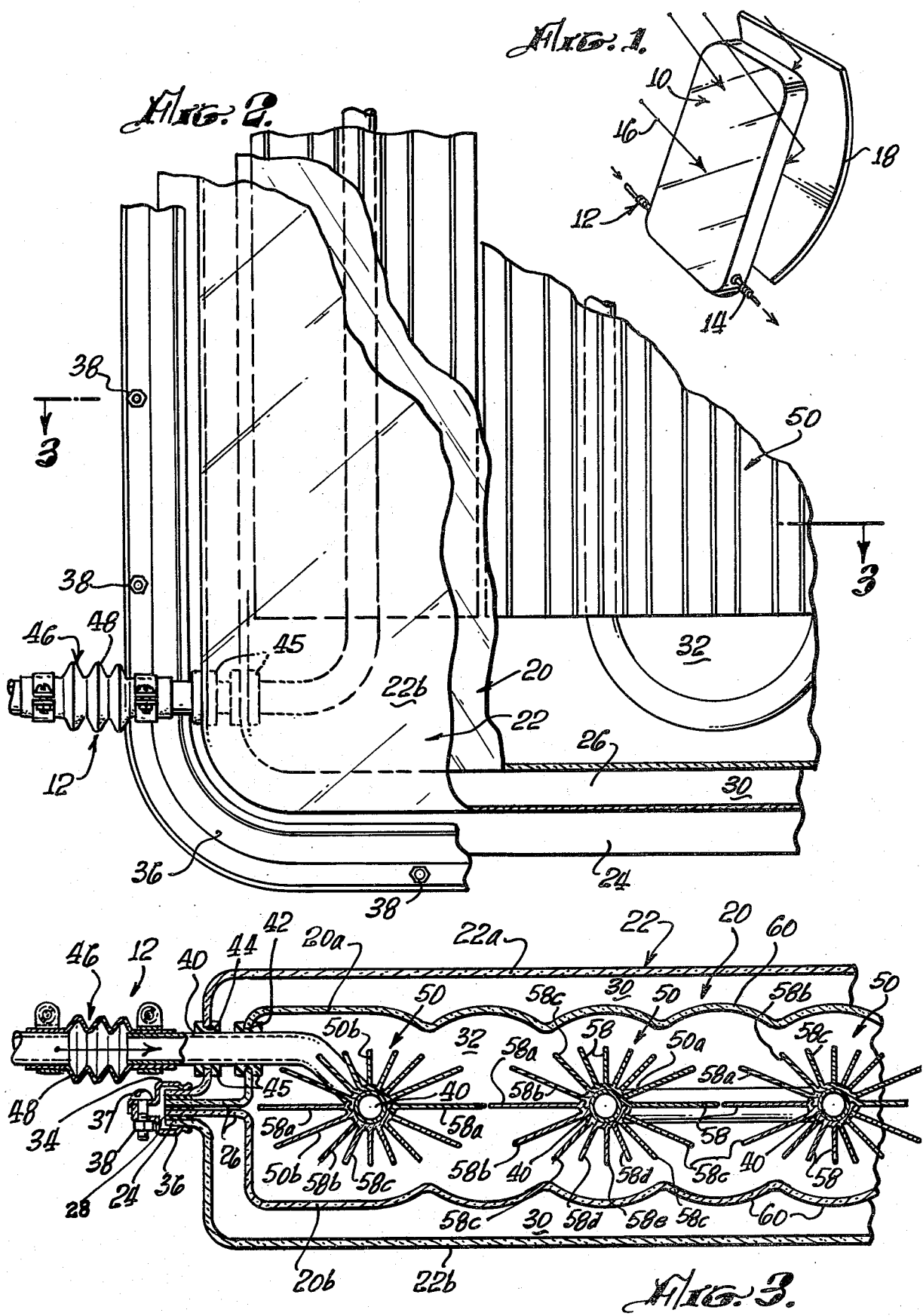

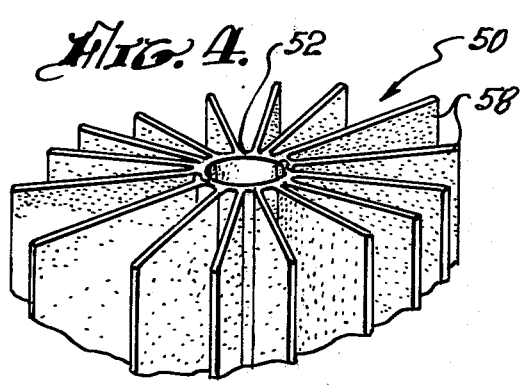
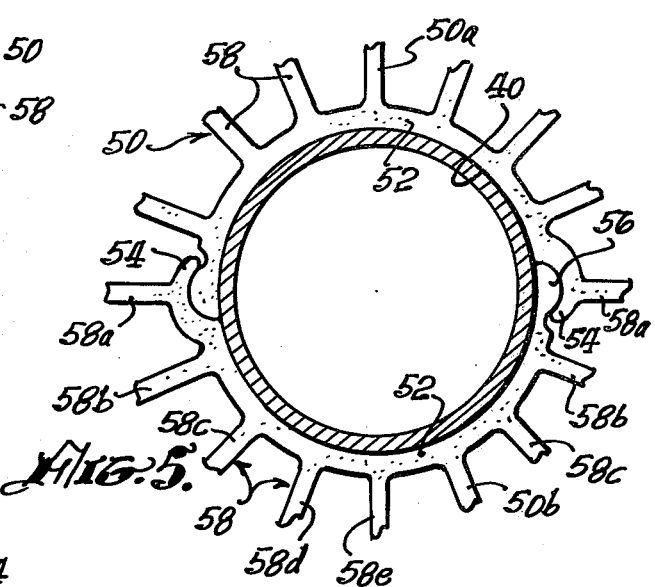
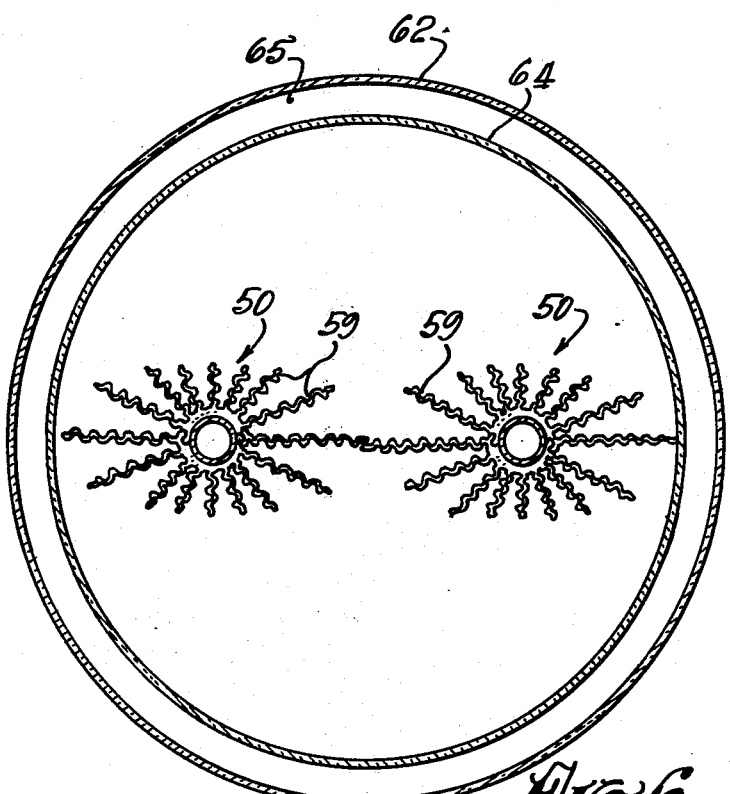
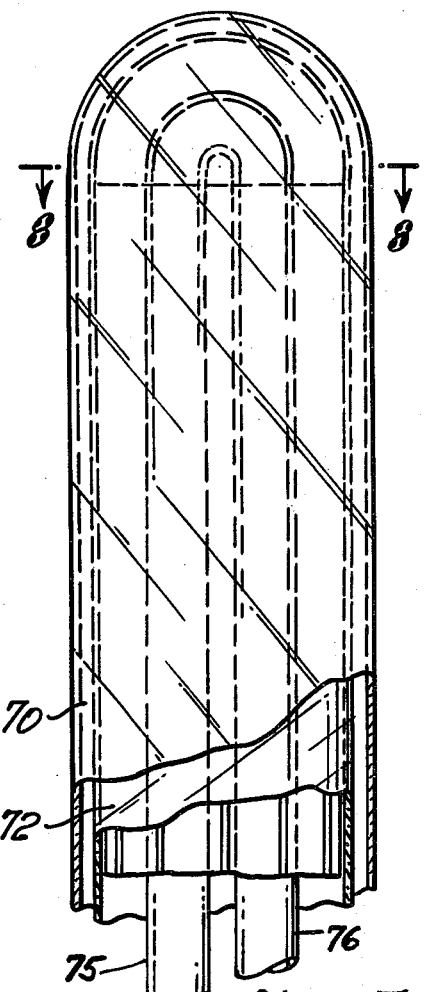
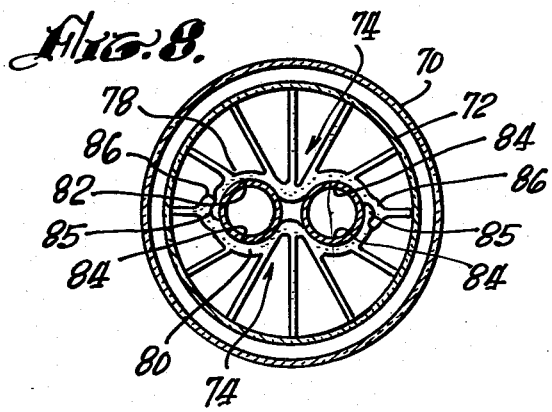

SOLAR-HEAT COLLECTOR

BACKGROUND OF THE INVENTION

1. Field of the Invention

This invention relates generally to a solar-heater device, and more particularly to a solar-heat collector having unique solar-energy-collector plates—providing a substantially increased absorbing area which maximizes the heat transfer to the flowing fluid within the heater.

2. Description of the Prior Art

As is well known in the art, various problems and difficulties are encountered in providing suitable means for total absorption of the rays of the sun to the flowing fluid within a solar-collection system. There is a need to provide a larger exposed area capable of utilizing solar radiation without substantially increasing the size and cost of the device.

Many types of solar heaters or collectors are presently in use in the various geographical locations which have different requirements. However, these devices have features that restrict their use or location; and they are complicated to install and expensive to maintain, since they are generally exposed to the various weather conditions.

Such examples of prior and known solar fluid heaters are disclosed in U.S. Pat. No. 3,974,824 to Ronald H. Smith. The Smith device utilizes a cylindrical reflector with a spirally extending section for concentrating solar energy on an axially disposed absorber.

Another type of solar fluid heater is disclosed in U.S. Pat. No. 4,026,273 to Blaine F. Parker. This device includes a radiation trap for concentrating solar radiation which has been focused on or near a line at the center of a transparent pipe assembly. One of more sets of reflective fins are disposed in direct heat-exchanging contact with the fluid to be heated.

A further solar device is shown and described in U.S. Pat. No. 2,907,318 to A. E. Awot.

However, there is still needed a solar fluid-heater apparatus that is designed for a more universal application with maximized capabilities of absorbing solar-radiant energy with the simplest components.

SUMMARY OF THE INVENTION

The present invention comprises a solar-heat collector wherein a fluid, tubular, heat-receiving pipe is arranged having positioned and engaged thereon a plurality of longitudinal, fin-like plate members which radiate outwardly and are generally formed of an aluminum extrusion. The longitudinal plates are integrally formed by two interlocking and continuous mold sections which are coupled together about the outer periphery of the conducting pipe.

In the preferred embodiment, each fin is provided with a predetermined width at various angular degrees, whereby the overall absorbing area is substantially increased in order to provide maximum solar-radiation impingement thereon, so as to transfer the solar energy directly into the wall of the fluid-carrying pipe enclosed within the elongated molds.

Further, the finned molds and pipe are disposed in a dual-arranged housing—that is, an inner housing encapsulates the fins and pipe in a substantially sealed environment wherein the walls of the housing are shaped having segmented domes, thus creating radiation-focusing members to collect wide-angle incoming radiation.

A second outer housing—also of a clear material—is superposed over the inner housing; and it, too, is substantially sealed wherein an insulating "dead-air" space is formed between the two housings. The clear housings are arranged so that radiation is allowed to pass through at all angles, thus striking the radiating fin members.

Hence, reflection devices are readily compatible with this device, allowing additional radiation from both the front or back sides, when placed in operating condition.

OBJECTS AND ADVANTAGES OF THE INVENTION

The present invention has for an important object a provision wherein a solar-heated-fluid-collecting device is so designed wherein the maximum solar energy is absorbed under the most simple operating conditions.

It is another object of the present invention to provide a solar heated-fluid collector having an improved construction of clear inner and outer housing units arranged to define an insulated space disposed therebetween, wherein the inner housing includes a plurality of dome-shaped, radiation concentrators wherein substantially all of the solar radiation penetrating the housing is converted to heat.

It is still another object of the invention to provide a solar heated-fluid-collector device that includes a pair of interlocking molds having a plurality of radially extending fin members that are disposed longitudinally to the pipe, and have various angular displacements and widths so as to provide a maximum overall exposure to the incoming solar radiation.

It is a further object of the invention to provide a device of this character wherein both sides of the housing are adapted to receive solar radiation, and wherein a reflector device combined therewith allows for increased radiation.

It is still a further object of the invention to provide a device of this character that is easy to install, service and maintain.

Still another object of the invention is to provide a solar heater that is relatively inexpensive to manufacture, and simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

The objects of the present invention and the attendant advantages thereof may be better understood by reference to the following drawings, which are for illustrative purposes only, wherein:

FIG. 1 is a diagrammatic, perspective view of a solar-heated-fluid collector having a reflector means positioned relative thereto;

FIG. 2 is an enlarged plan view of a portion of the present device with sections broken away to illustrate various elements therein;

FIG. 3 is a cross-sectional view taken substantially along line 3—3 of FIG. 2;

FIG. 4 is a perspective view of one end of a solar-radiation-collector molding member wherein the two sections are coupled together;

FIG. 5 is an enlarged, transverse, cross-sectional view of a pipe having the solar-radiation-collector molding secured thereto;

FIG. 6 is a sectional view of an alternative arrangement of a solar housing having a pair of solar-radiation-collection units disposed therein;

FIG. 7 is a plan view of a portion of an alternative embodiment of a solar-heated-fluid collector having a differently arranged solar-radiation collector unit positioned therein; and FIG. 8 is a cross-sectional view taken along line 8—8 of FIG. 7 thereof.

DETAILED DESCRIPTION OF THE PREFERRED EMBODIMENT

Referring now to FIGS. 1 through 5, and more particularly to FIG. 1, there is shown a solar-heated-fluid-collection device, generally indicated at 10, having inlet and outlet means designated at 12 and 14, respectively. As noted, the collection device is positioned angularly relative to the incident impinging solar radiation, indicated by arrows 16. Because of the specific construction of this device, which will be hereinafter described in detail, a reflector means, such as the parabolic reflector 18, can be readily positioned to provide a means to reflect solar radiation to the rear-facing surface of the collector device—adding to its ability to be highly efficient with a low rate of solar-energy loss.

The solar-heated-fluid-collection device 10 comprises an inner housing means indicated at 20, and an outer housing means indicated at 22, the inner housing 20 being supported within the outer housing whereby a "dead" air space or gap is defined—creating a clear insulation means which allows solar energy to freely pass from the outer housing into the inner housing, each housing being formed from a clear glass or plastic material, or any suitable combination thereof.

Outer-housing means 22 in this particular arrangement comprises two oppositely positioned half-wall sections 22a and 22b. These half-wall sections generally take a rectangular form, as shown in FIG. 1, and are fastened together along the peripheral edges formed by a continuous flange member 24. The exposed surface of each section is preferably flat, as shown, but may be formed in various configurations that cause the impinging rays to be concentrated within the housing itself.

The inner-housing means 20 is also provided with oppositely arranged half-wall sections 20a and 20b, respectively, with each half-wall section 20a and 20b having peripheral flange members 26. Thus, as shown in FIG. 3, flange members 26 are positioned between flange members 24, wherein annular gasket members 28 are interposed therebetween to seal the flanges in their respective positions—preventing, to some extent, ambient air from reaching chambers 30 formed between the inner and outer housings, and from reaching the solar chamber 32 formed by the inner-housing wall sections.

Chambers 30, encapsulating inner housing 20, define a "dead"-air insulating space wherein the inner housing is not affected by rapid, outer, ambient-temperature changes.

To provide a means for fastening housings 20 and 22 in their respective sealed relationship, there is included securing means mounted to the peripheral flange members, said means being shown as a pair of frame members 34 and 36 fastened together by nuts and bolts 38 and 39, respectively.

Disposed within the inner housing 20 is a continuous line of pipe 40 which enters through openings 42 and 44 of the respective housings 20 and 22. Each opening is provided with a sealing grommet 45 with similar openings and seals located therein to allow the pipe or tubing 40 to exit said housings at the opposite side, as seen in FIG. 1.

Accordingly, the pipe or tubing 40 is bent back on itself so as to provide juxtaposed parallel conduits through which flows fluid—preferably water. Thus, water enters through inlet 12, and travels through pipe 40 and discharges through outlet 14. Both outlets are adapted to be coupled to a closed water system (not shown). As an example, a coupling means 46 is shown in FIGS. 2 and 3. This coupling means can be any known device that is flexible like a bellows-type hose 48.

Accordingly, the object is to collect as much incoming solar radiation with the housings and concentrate that energy to impinge on the continuously arranged pipe 40, wherein the water is efficiently heated as it passes through. Thus, in order to provide and enhance the heating of the water at a faster rate with more efficiency, there is included a solar-heat-absorbing-collector member mounted to each elongated parallel length of juxtaposed pipe. This solar-heat-absorbing-collector member is designated at 50 and comprises two identical half sections of extruded-aluminum-molded jackets 50a and 50b. Each half section includes a main, longitudinal, semicircular body 52, which—when coupled together—encapsulates the longitudinal pipe sections. The free longitudinal edges of body 52 are further provided with coupling means, wherein one edge is formed with a locking tongue member 54, and the other edge is formed as a longitudinal rib 56 arranged to be received in the locking tongue of a mating body 52, as seen in FIG. 5. That is, when the half sections of the solar-heat absorbing collector are coupled together, the locking tongue 54 of the first half section 50a couples with the mating rib member 56 of the second half section 50b. Further, however, each body includes a plurality of integrally formed heat-absorbing fin members defined by elongated plates 58 wherein each plate or fin extends the full length of body 52.

The fin members 58 are arranged so as to have their width extend radially outward from body 52 at various angular degrees. This allows for greater exposed area for impinging radiation—thus providing greater heat absorption. It should be further noted that additional absorbing area is provided by varying the widths of the adjacent fin members, so that fin 58a has the largest width for greater exposure—the adjacent fin 58b being slightly smaller in width, and fin members 58c, 58d and 58e being even smaller in width. This arrangement allows for maximum area exposure as the direction of the sun travels during the day.

Accordingly, the sun's rays are absorbed in the radial fin members 58, thus transferring the heat directly into the wall of pipe or tubing 40.

It is further contemplated that each solar-absorbing section will be anodized or coated with black heat-absorption material.

In order to provide even greater concentration of the entering solar rays, inner housing sections 20a and 20b are formed with a plurality of contiguously disposed and elongated domes 60, defining radiation-concentrating means. Each dome 60 causes the incoming rays to be focused on a different area of the exposed fins, thus providing the optimum of transmitted rays from the outer housing into the chamber 32.

Referring now to FIG. 6, there is shown an alternative arrangement of the outer and inner housings, wherein the outer and inner housings 62 and 64, respectively, are formed as elongated tubular housings coaxially aligned, one within the other, and having an insulated "dead-air" chamber or space 65 positioned therebetween. Here again, it is contemplated that each housing will be constructed of known materials that allow the solar radiation to pass therethrough and strike the solar-heat-absorbing-collector members 50. The molded jackets are as previously described heretofore. In addition, it is further contemplated that a vacuum could be provided in chamber 65 as well as chamber 66 of the inner housing 64. In this illustration, each solar-heat-absorbing collector member 50 is designed wherein the longitudinal fin members are corrugated, as indicated at 59. Thus, the fin area is still further increased to receive a maximum amount of solar radiation so as to be readily transferred to the respective pipe.

In FIG. 7—which is another modified form of the invention—there is shown outer and inner housings 70 and 72, respectively. In this modified arrangement, the molded jackets 74 are designed to receive two longitudinally disposed pipes 75 and 76. That is, each half-sectioned body member 78 and 80 comprises dual, adjacent, semicircular channels 82 and 84 wherein the free edge of channel 82 includes a longitudinal rib member 85, and the outer free edge of channel 84 is provided with locking tongue 86. Thus, the sections snap together in a clamping arrangement, as seen in FIG. 8. Fin members are also included, as previously described.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specfic form shown or uses mentioned, except as defined in the accompanying claims.

I claim:

1. A solar-heat-collector device having a continuous conduit of a plurality of parallel, juxtaposed, longitudinal pipe sections for passage of fluid therethrough, said device comprising:

an inner, substantially sealed housing having said conduits positioned therein, said housing being formed to allow passage of solar radiation therethrough;

an outer, substantially sealed housing arranged to encapsulate said inner housing, and formed to allow passage of solar radiation therethrough;

a solar-heat-absorbing-collector member removably mounted to each elongated parallel length of pipe section, in order to transfer the solar heat into said pipe sections;

wherein said solar-heat-absorbing-collector member comprises a first half section of an elongated molder jacket, a second, matching, half section of an elongated molder jacket, wherein each jacket includes a plurality of longitudinally formed fin members radially disposed about the pipe, in order to absorb and transfer said solar radiation passing through said housings, wherein said molded jackets comprise a main, longitudinal, semicircular body having said elongated fin members integrally formed as part thereof, said fin members extending radially outward at different angular degrees, and wherein the width of each fin member varies according to the angular displacement thereof, and coupling means formed on said jackets and arranged to couple the half sections together, thus enclosing said elongated pipe sections therein;

an inlet and an outlet means connected to said continuous conduit to allow said flud flow to enter and discharge therefrom; and sealing means disposed between said inner and outer housings, and between said housings and said conduit;

an insulation chamber interposed between said inner and outer housings;

said outer housing comprising a pair of oppositely positioned half-wall sections;

wherein said inner housing comprises a pair of oppositely positioned half-wall sections, said sealing means being interposed between each of said half-wall sections of both housings;

said half-wall sections of said inner housing including radiation-concentrating means to concentrate and focus radiation impinging on said fin members; and securing means arranged to secure said wall sections and said sealing means together.

2. A solar-heat-collector device as recited in claim 1, wherein said radiation-concentrating means comprises a plurality of contiguously disposed, elongated, dome members arranged above and below said solar-heat-absorbing-collector members.

3. A solar-heat-collector device as recited in claim 2, wherein there is included a reflector means to be positioned adjacent the side of said device not positioned to receive direct solar radiation.

4. A solar-heat-collector device as recited in claim 3, wherein said housings are formed from glass.

5. a solar-heat-collector device as recited in claim 3, wherein said housings are formed from plastic materials capable of allowing solar radiation to pass therethrough.

* * * * *